UNITED STATES PATENT OFFICE.

EDWARD BEANES, OF HAVANA, CUBA.

IMPROVEMENT IN THE MANUFACTURE AND REFINING OF SUGAR.

Specification forming part of Letters Patent No. 36,067, dated August 5, 1862.

*To all whom it may concern:*

Be it known that I, EDWARD BEANES, of Havana, in the Island of Cuba, have invented a new and useful Improvement in the Manufacture and Refining of Sugar; and I do hereby declare that the following is a full, clear, and exact description of the same.

This invention consists in the employment of phosphate of ammonia in conjunction with sulphurous acid or any of the sulphites in the manufacture of sugar from cane or other juice, and in the refining of raw sugar.

To enable others skilled in the art to use my invention, I will proceed to describe the manner in which it is performed.

In the manufacture of sugar from the juice I prefer, first, to add caustic lime or lime-water to the juice in the "cold" until the natural acids of the juice are neutralized, then to add an additional quantity of lime, ranging from two (2) to eight (8) ounces of lime to every hundred (100) gallons of juice, according to the quality of the latter. I then inject sulphurous-acid gas through a perforated coil into the juice until a slightly acid reaction is exhibited, and afterward add phosphate of ammonia in a liquid state in about the proportion of from one (1) to two (2) ounces to every hundred (100) gallons of juice, leaving the juice neutral in every case, either by using more acid, if alkaline, or more lime, if acid. The rest of the process is the same as is generally practiced on sugar-plantations. Bisulphite of lime, or any other sulphite, can be used instead of the lime and sulphurous acid. For refining, caustic lime or lime-water is to be added to the raw sirup in the "blow up" until it is quite alkaline. Sulphurous-acid gas is then injected into the sirup through a perforated coil in the blow-up until it is slightly acid. Bisulphite of lime, or any other sulphite, can be used instead of the lime and sulphurous acid, as in the manufacture of sugar from the raw juice; but I prefer to use the lime and sulphurous acid. Phosphate of ammonia in a liquid state is then introduced in about the proportion of one (1) pound of the phosphate to five hundred (500) pounds of sugar. More or less may, however, be used, according to the quality of the raw sugar; but the relative quantities of phosphate of ammonia and sulphurous acid must be so proportioned that the sirup will be neutral after the phosphate of ammonia shall have been added. The sirup is then brought to the boiling-point, and afterward run off into the bag or other filter, to be subsequently heated, as in the usual process of refining.

In some cases the phosphate of ammonia may be used in the sirup in the manufacturing of sugar from the juice in the same way as above described for refining.

The sulphurous acid may be used in a liquid, instead of in a gaseous state.

I do not consider it absolutely necessary that the proportions of the materials I have mentioned should be strictly adhered to, as they may be varied according to circumstances, as may in the judgment of the sugar boiler or refiner seem desirable.

I do not claim the use of sulphurous acid or bisulphite of lime alone in the manufacture or refining of sugar; but

What I claim as my invention, and desire to secure by Letters Patent, is—

The employment of phosphate of ammonia in conjunction with sulphurous acid or any of the sulphites in the manufacture and refining of sugar, substantially as and for the purpose herein described.

EDWD. BEANES.

Witnesses:
 THOS. SAVAGE,
 JOHN VAN DEWATER.